(12) United States Patent
Brown et al.

(10) Patent No.: US 8,065,917 B1
(45) Date of Patent: Nov. 29, 2011

(54) MODULAR PRESSURE SENSOR

(75) Inventors: Gregory C. Brown, Chanhassen, MN (US); Thomas A. Larson, St. Louis Park, MN (US); Curtis Rahn, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 21 days.

(21) Appl. No.: 12/782,325

(22) Filed: May 18, 2010

(51) Int. Cl.
*G01L 7/00* (2006.01)
(52) U.S. Cl. .......................................... 73/706
(58) Field of Classification Search .................. None
See application file for complete search history.

(56) References Cited

U.S. PATENT DOCUMENTS

| | | | |
|---|---|---|---|
| 5,029,478 A | 7/1991 | Wamstad | |
| 5,133,215 A | 7/1992 | Lane, III et al. | |
| 5,438,876 A * | 8/1995 | Lewis | 73/726 |
| 5,459,351 A | 10/1995 | Bender | |
| 5,522,267 A * | 6/1996 | Lewis | 73/726 |
| 7,210,346 B1 | 5/2007 | Hoover et al. | |
| 7,647,835 B2 | 1/2010 | Speldrich | |
| 2006/0001992 A1* | 1/2006 | Friedrichs | 360/6 |
| 2007/0062601 A1* | 3/2007 | Ballard | 141/94 |
| 2009/0293628 A1 | 12/2009 | Brown et al. | |
| 2009/0293630 A1 | 12/2009 | DiPaola et al. | |

* cited by examiner

*Primary Examiner* — Andre Allen
(74) *Attorney, Agent, or Firm* — Fogg & Powers LLC

(57) ABSTRACT

A pressure sensor device for a modular pressure sensor package is provided, comprising a substrate having a pressure port that extends through the substrate from a first side of the substrate to a second side of the substrate. A pressure sensor die is attached to the first side of the substrate, forming a seal over the pressure port on the first side of the substrate. A cover is attached to the first side of the substrate over the pressure sensor die, forming a sealed cavity wherein the pressure sensor die is located within the cavity. The device also comprises a plurality of electrical connectors mounted to the substrate external to the cavity, the plurality of electrical connectors electrically coupled to the pressure sensor die. Further, the substrate includes at least one mounting element configured to secure a pressure port interface to the second side of the substrate in a position around the pressure port.

20 Claims, 8 Drawing Sheets

MODULAR PRESSURE SENSOR

BACKGROUND

High accuracy pressure sensors are applicable to many different types of applications and usually require precise sealing. A typical legacy pressure sensor maintains a vacuum cavity between a header and a pressure sensor die. Often the pressure sensor and its attachment must be custom designed for a particular application and is not easily replaced. Electrical pins extend into a reference cavity and are subject to mechanical loading, possibly leading to leaking of the cavity. Molecular off-gassing into the cavity ages and degrades the performance of the pressure sensor. Additionally, legacy pressure sensor packages are also constrained with respect to the size of the pressure sensor die (with different header designs for different pressure sensor die sizes) and mounting the pressure sensor package can be difficult due to inconvenient placement of the electrical pins.

For the reasons stated above and for other reasons stated below which will become apparent to those skilled in the art upon reading and understanding the specification, there is a need in the art for a modular sensor package with improved stress isolation, reduced aging effects, and is adaptable for many end-use applications.

SUMMARY

The embodiments of the present invention provide methods, systems, and apparatus' for modular pressure sensor devices and will be understood by reading and studying the following specification.

Modular pressure sensor devices are provided. In one embodiment, a pressure sensor device comprises a substrate having a pressure port that extends through the substrate from a first side of the substrate to a second side of the substrate. A pressure sensor die is attached to the first side of the substrate, forming a seal over the pressure port on the first side of the substrate. A cover is attached to the first side of the substrate over the pressure sensor die, forming a sealed cavity wherein the pressure sensor die is located within the cavity. A plurality of electrical connectors is mounted to the substrate external to the cavity, the plurality of electrical connectors electrically coupled to the pressure sensor die. The substrate also includes at least one mounting element configured to secure a pressure port interface to the second side of the substrate in a position around the pressure port.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention provide a modular sensor packaging approach that is easily adapted for different pneumatic connection requirements while addressing the sealing and stress isolation concerns that typically affect pressure sensors. As will be discussed in more detail below, a modular sensor packaging approach for silicon-based pressure sensor dies provides very low correctable errors, integral stress isolation to reduce errors, interface to different end-use requirements, and supports low cost manufacturing strategies.

Some embodiments of the modular sensor package implement swappable pressure port interfaces suitable for various applications. Embodiments of the present invention provide a pressure sensor whose electrical connections do not pierce through reference cavity of the pressure sensor. Other embodiments of the present invention improve the performance of the pressure sensor through co-locating electronic circuitry with a pressure sensor die. Embodiments of the present invention employ different bonding techniques to improve the functionality of the modular sensor package.

Figure 1:
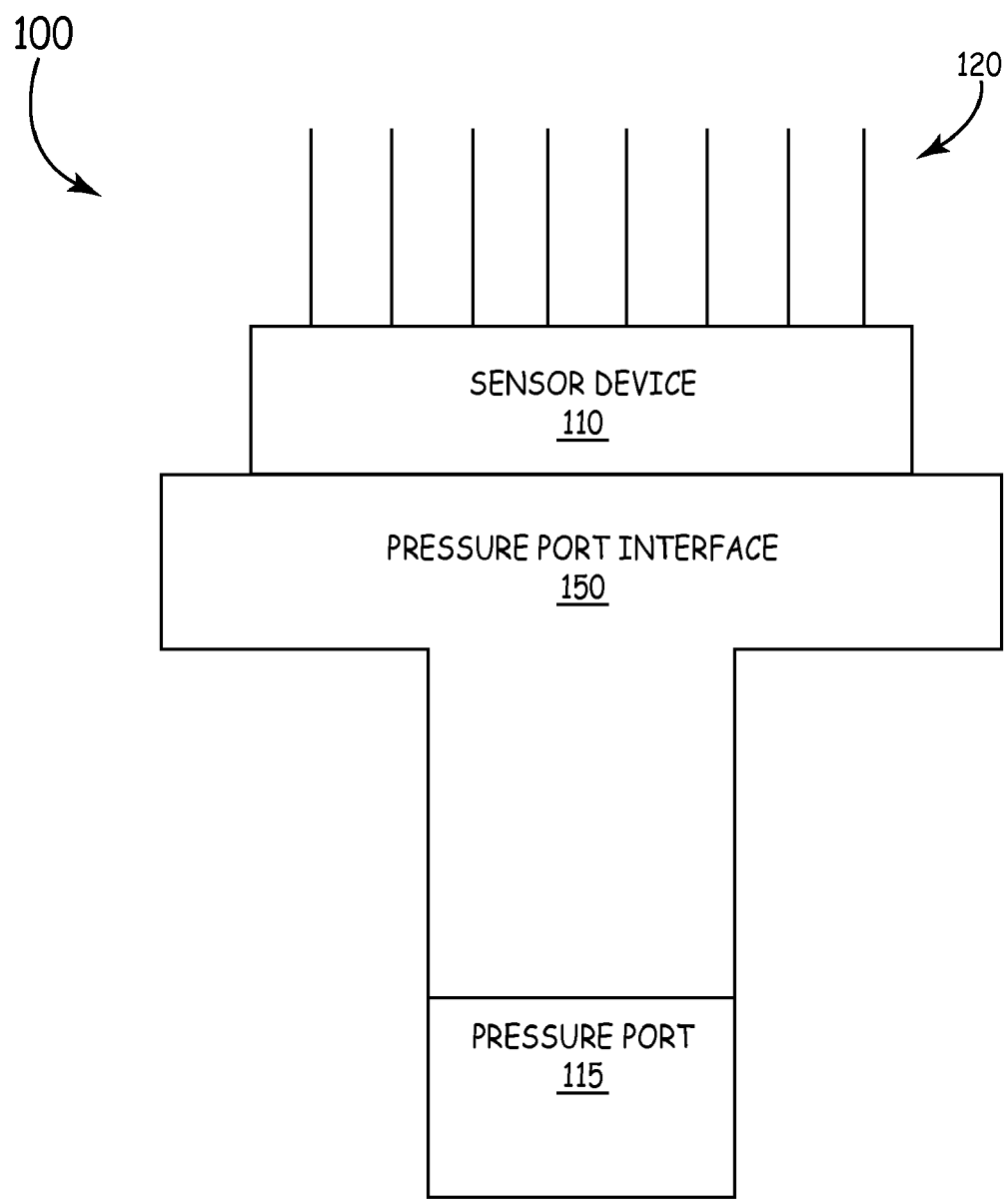
FIG. 1 is a simplified block diagram of one embodiment of the present invention of a modular sensor package.

FIG. 1 is a simplified block diagram of one embodiment of the present invention of a modular sensor package 100. The modular sensor package 100 comprises a sensor device 110 and a pressure port interface 150. Further illustrated in FIG. 1, electrical pins 120 provide electrical connectivity for pressure sensor 110. As will be discussed in greater detail below, pressure port interface 150 is designed to mechanically couple sensor device 110 to a pressure port 115. Pressure port interface 150 may include one of a myriad of pressure port fittings such as, but not limited to, a threaded fitting or a swage fitting. Accordingly, the particular pressure port interface 150 is selected to match the pressure port fitting used at pressure port 115. Pressure port interface 150 then provides a path for delivering the particular process delivered at pressure port 115 (for example, gas or liquid) to sensor device 110 so that sensor device 110 can measure the pressure of the process.

FIG. 1 illustrates the modular sensor packaging approach of embodiments of the present invention. Pressure port interface 150 can be selected based on the type of port fitting used at pressure port 115. A particular sensor device 110 can be selected based on the type of process being delivered to pressure port 115 as well as the particular pressure range and sensitivity requirements that sensor device 110 is expected to cover. Thus, a range of different configurations of sensor devices 110 and pressure port interfaces 150 can be achieved. Further, should a sensor device 110 fail, or requirements change, pressure sensor 110 can be removed and replaced without the need to remove pressure port interface 150 from pressure port 115.

In alternate embodiments, pressure port interface 150 comprises stainless steel, aluminum, Inconel 756, or any other material compatible with the pressure requirements at pressure port 115 and parameters of the particular installation environment, such as temperature.

Figure 2A:
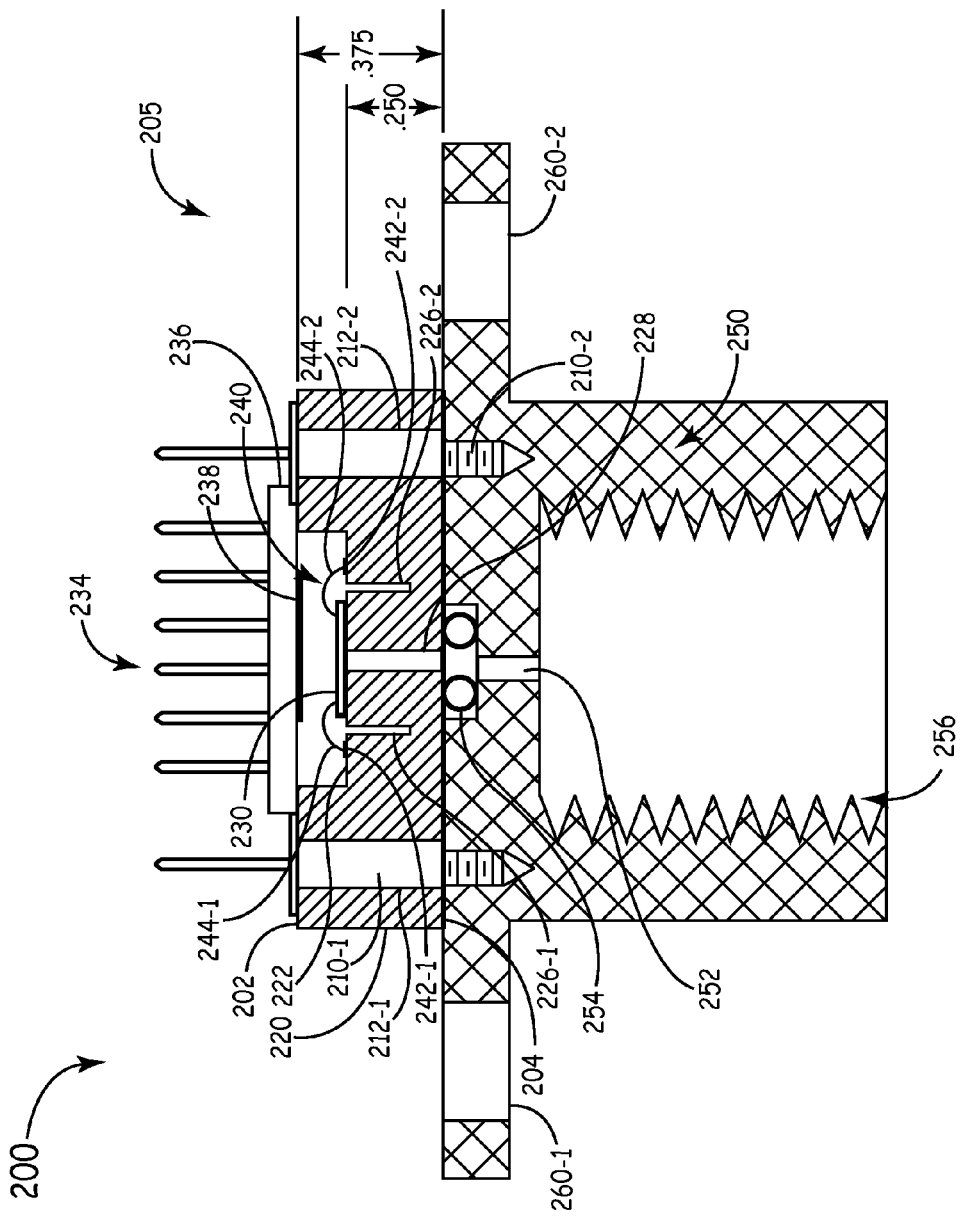
FIGS. 2A and 2B are views of one embodiment of the present invention of a modular sensor package.
Figure 2B:
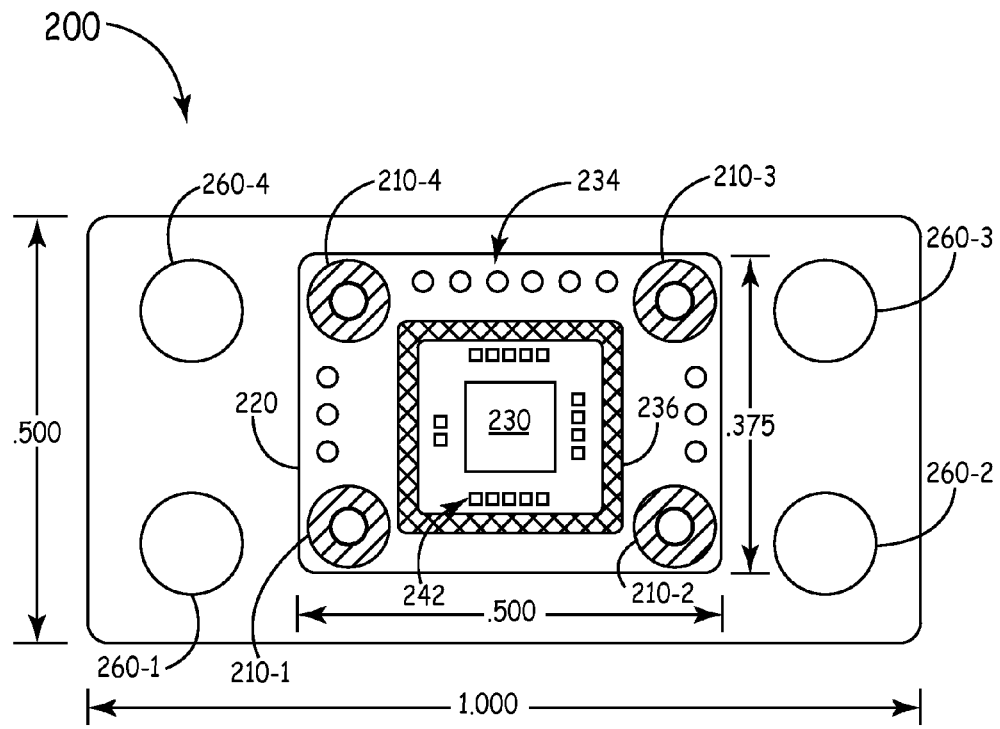

FIGS. 2A and 2B are views of one embodiment of the present invention of a modular sensor package shown generally at 200. FIG. 2A is a side view and FIG. 2B is a top view of the modular pressure sensor package 200. Modular sensor package 200 comprises a sensor device 205 and a pressure port interface 250. Sensor device 200 further comprises a ceramic substrate 220, a pressure sensor die 230, a cover 236, and a plurality of electrical connectors 234. A recess 222 formed in ceramic substrate 220 holds pressure sensor die 230 and defines a sealed cavity 240 when cover 236 is bonded to the substrate 220.

In alternate embodiments, cover 236 is bonded to ceramic substrate 220 using either thermal electric (TE) bonding or brazing. TE bonding is a form of ionic bonding used to bond a first material (such as silicon) to a second material (such as certain glasses, including ceramic or pyrex). Transport of mobile ions from the silicon to the second material forms an air tight bond. Where TE bonding is used, part of the surface of ceramic substrate 220 is prepared for TE bonding and TE bonding is used to make sealed attachments of ceramic substrate 220 to pressure sensor die 230 and cover 236. Brazing is an attachment process where a filler material is heated to liquid form and placed between two parts, where it forms a seal upon cooling. In one embodiment where brazing is used, the interfaces of ceramic substrate 220 to pressure sensor die 230, cover 236, and pressure port interface 250 are brazed. TE bonding has an advantage over brazing in that it will not break down when used for high temperature applications (for example, in excess of 275° C.), provides excellent vacuum integrity, and simplifies the process of assembling the modular sensor package 200. Further, in alternate embodiments, cover 236 acts as a second level pressure containment boundary should the integrity of pressure sensor die 230 fail. In one such embodiment, cover 236 would be subject to high pressures in excess of 2.5 kilopound/in$^2$ (KSI). In alternate embodiments, cover 236 comprises silicon, Kovar (a nickel-cobalt ferrous alloy), Invar (a nickel-steel alloy), Nispan (a nickel-chrome-iron alloy), or any other suitable material. In an embodiment where TE bonding is used, cover 236 is generally straight and can support some of the electrical connectors 234.

In one embodiment, ceramic substrate 220 comprises a low temperature co-fired ceramic (LTCC) material that closely or approximately matches the thermal coefficient of expansion (TCE) of silicon. In other embodiments, ceramic substrate 220 comprises a composite of different types of co-fired ceramics. For example, one embodiment of ceramic substrate 220 comprises an intermingled mix of high temperature co-fired ceramics (HTCC) and low temperature co-fired ceramics, wherein different sections of the ceramic substrate 220 are selected for the primary use of that portion of ceramic substrate 220. For example, sections of the ceramic substrate 220 that bond to the cover 236 or pressure port interface 250 are selected for strength, brazability, etc. and the portion of ceramic substrate 220 that pressure sensor die 230 is bonded to is approximately matched to the TCE of the pressure sensor die 230. In one embodiment, part or all of ceramic substrate 220 comprises a glass with having a higher anneal and melting point than the temperature required for TE bonding (for example, SD-2 glass available from HOYA Corp.).

In one embodiment, ceramic substrate 220 is comprised of composite materials that approximately match the TCE of the different ceramics it comprises to each other. In another embodiment, the TCEs of ceramic substrate 220 and pressure sensor die 230 are also approximately matched. This improves stress isolation, reducing non-critical errors of the pressure sensor 205, and eliminates the need for a separate precision and stress isolation component used in legacy sensor packages.

In one embodiment, ceramic substrate 220 comprises at least two stress isolation trenches 226-1 and 226-2 formed within cavity 240. In the particular embodiment shown in FIG. 2A, stress isolation trenches 226-1 and 226-2 are situated underneath wire bonds 244. Stress isolation trenches 226-1 and 226-2 are located within cavity 240 to reduce the amount of stress transmitted to the pressure sensor die 230 from the ceramic substrate 220. The thickness and depth of stress isolation trenches 226-1 and 226-2 are selected for the particular embodiment of the modular sensor package 200. Generally, the closer the TCEs of ceramic substrate 220 and pressure sensor die 130 match, the smaller stress isolation trenches 226-1 and 226-2 can be for a given reduction in stress. In the embodiment shown in FIG. 2A, the first stress isolation trench 226-1 is formed on a first side of the pressure sensor die 230 and the second stress isolation trench 226-2 is formed on a second side of the pressure sensor die 230. Ceramic substrate 220 also comprises a pressure port 228 that exposes the pressure sensor die 230 to the pressure of the pressure port such as pressure port 115 in FIG. 1.

Ceramic substrate 220 further comprises a pressure port 228 that exposes pressure sensor die 230 to the pressure of the process received at pressure port interface 250. Pressure port 228 extends completely through ceramic substrate 220 directly below the pressure sensor die 230. Pressure sensor die 230 measures the pressure received at pressure port 228 and converts those measurements into electrical signals provided via a plurality of electrical connectors, shown at 234.

Electrical connectors 234 are coupled, either directly or indirectly, to pressure sensor die 230. In one embodiment, a plurality of electrical pads 242 surround the pressure sensor die 230 inside the cavity 240 and are coupled to pressure sensor die 230 via a plurality of wire bonds 244. In one embodiment, the electrical pads 342 comprise gold, but may alternately comprise any other suitable electrically conducting material.

Figure 2C:
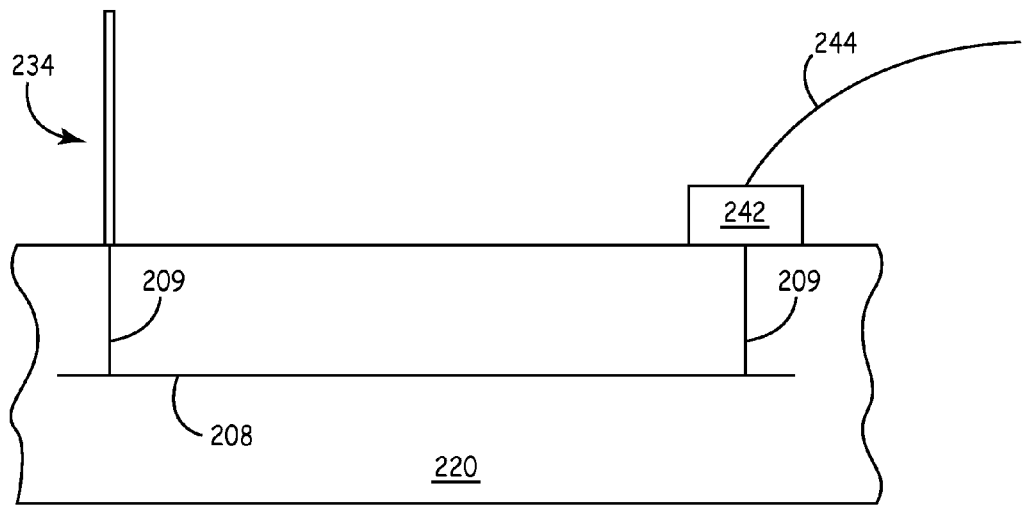
FIG. 2C is a view of one embodiment of the present invention of a ceramic substrate.

Turning to FIG. 2C, a view of one embodiment of the present invention of a ceramic substrate 220 is shown. Ceramic substrate 220 further comprises wire traces 208 which provide electrical conductivity between the electrical connector 234 and the electrical pad 242 through ceramic substrate 220. By providing electrical connectivity between the external electrical connectors 234 and the electrical pads 242 via traces 208 within substrate 220, embodiments of the present invention avoid the need to penetrate the seal of cavity 240, which avoids one potential source of seal leakage into cavity 240. In one embodiment, wire traces 208 are comprised of embedded layers of metallization that aid in maintaining the structural integrity of ceramic substrate 220 when through vias 209 are formed in ceramic substrate 220.

Returning to FIG. 2A, because cavity 240 is sealed by a cover 236, cavity 240 acts as a reference vacuum against which pressure sensor die 230 measures the pressure received at pressure port 228. In the embodiment of FIG. 2A, cavity 240 is held at an approximate vacuum and is referred to as a vacuum reference pressure. In other embodiments, cavity 240 contains one or more gasses of what is referred to as a gas reference pressure. In either case, the pressure within cavity 240 is referred to herein simply as a reference pressure. The accuracy of pressure measurements provided by sensor 200 is at least partially dependent on the pressure integrity of cavity 240. That is, the accuracy of pressure data provided over the lifetime of the modular sensor package 200 will be stable when the reference pressure in cavity 240 is stable over time and environmental factors. In one embodiment, to improve pressure integrity, a getter 238, a layer of reactive material, is applied to a surface of the cover 236 that is internal to the cavity 240. In one embodiment, the getter 238 is applied using sputtering techniques, for example. The getter 238 protects vacuum integrity through absorbing spurious gas molecules that are released over time into cavity 240.

Pressure sensor die 230 is a transducer that converts mechanical flexing of the pressure sensor die 230 due to pressure changes into electrical signals. Pressure sensor die 230 flexes in response to the difference between the processes pressure to which it is exposed through pressure port 228 and the reference pressure in cavity 240. The electrical signals are transmitted to connection pads 242 via wire bonds 244. In one embodiment, the pressure sensor die 230 is also TE bonded to ceramic substrate 220.

In the embodiment shown in FIG. 2A, ceramic substrate 220 is an LTCC material with a TCE equal to approximately that of silicon. The strength of ceramic substrate 220 is approximately 17 to 40 KSI and the theoretical TE bond strength between the silicon (for example, of pressure sensor die 230) and ceramic substrate 220 approaches this strength. In one implementation of modular sensor package 200, the pressure ported through the pressure port 228 is approximately 1 KSI.

In one embodiment, ceramic substrate 220 is connected to pressure port interface 250 with mounting screws 210-1 and 210-2 that pass through ceramic substrate 220 via through holes 212-1 and 212-2. In one embodiment, ceramic substrate 220 comprises a metallization layer 208 that strengthens ceramic substrate 220 where through holes 212-1 and 212-2 are formed. In other embodiments, ceramic substrate 220 attaches to pressure port interface 250 with fold over tabs, which may take up less physical space than mounting screws 210-1 and 210-2. In other embodiments, modular sensor package 200 use other attachment means.

In the embodiment shown in FIG. 2A, pressure port interface 250 comprises a threaded connection 256 for coupling pressure port interface 250 to an external threaded fitting. Pressure port interface 250 further comprises a pressure port opening 252 providing access to pressure port 228. Pressure port interface 250 further comprises a ring shaped seal 254 (such as an o-ring) that seals pressure port interface 250 against ceramic substrate 220, while leaving space for pressure port 228 to remain exposed to the process pressure. For embodiments in high temperature applications, ring shaped seal 254 is a non-organic seal (such as a braze ring). In one embodiment, pressure port interface 250 further comprises holes 260-1 through 260-4 for further securing pressure port interface 250 to an external device or system.

In the embodiment shown in FIG. 2A, electrical connectors 234 are mounted on a first side 202 of ceramic substrate 220 and the pressure port interface 250 is mounted on a second side 204 of ceramic substrate 220. Thus, electrical connectors 234 face in one direction while pressure port interface 250 faces in an opposing direction. This configuration provides improved stress isolation and reduces the mechanical load on the electrical connectors 234 over the legacy sensor package because more of the mechanical load on modular pressure sensor 200 is taken by pressure port interface 250 when the process pressure is high and during installation of the modular pressure sensor 200.

Exemplary dimensions of ceramic substrate 220 are approximately 0.500 inches by 0.375 inches. Exemplary dimensions of pressure port interface 250 are approximately 1.000 inches by 0.500 inches. However, other dimensions are contemplated. Ceramic substrate 220 accommodates various dimensions of pressure sensor die 230 within the scope of the dimensions of ceramic substrate 220 without changing the outer configuration around pressure sensor die 230.

Figure 3:
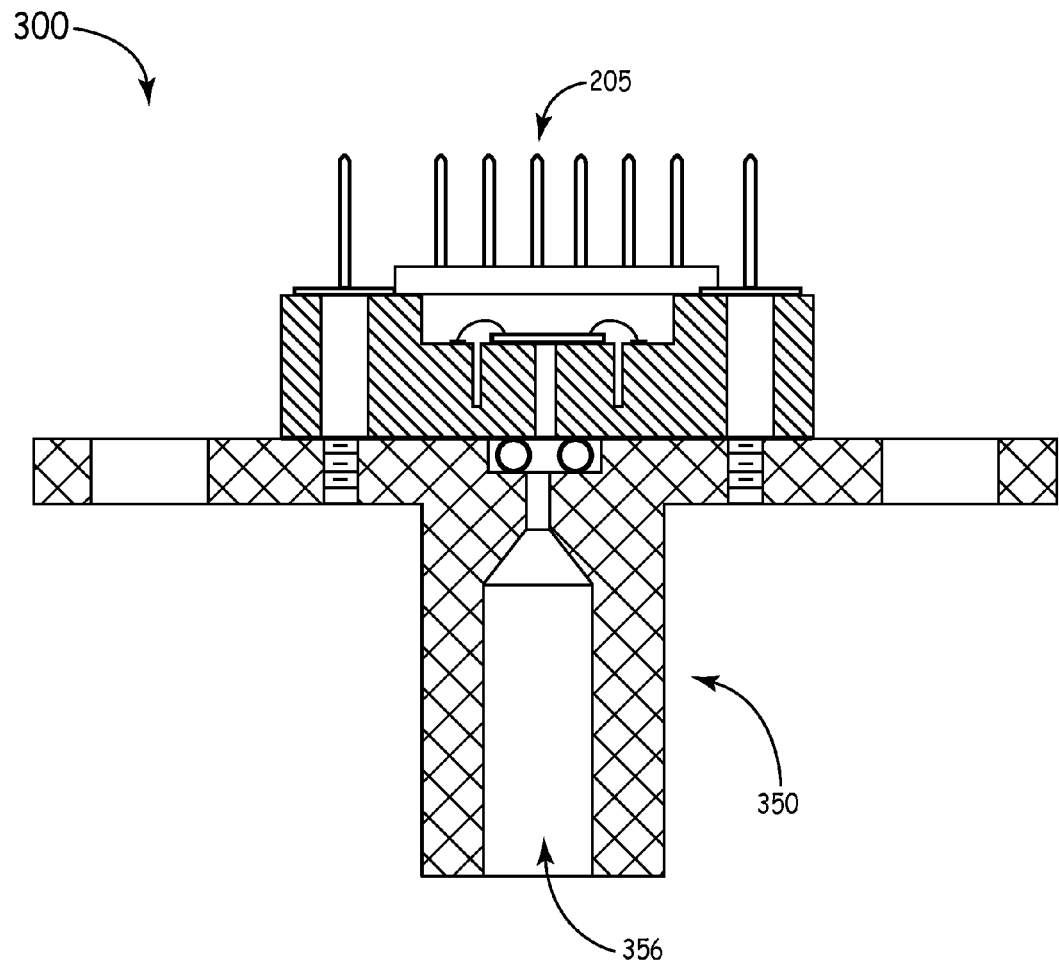
FIG. 3 is a side view of another embodiment of the present invention of a modular sensor package.

FIG. 3 is a side view of another embodiment of the present invention of a modular sensor package shown generally at 300 comprising the sensor device 205 described above with respect to FIGS. 2A-2C, coupled with a pressure port interface 350. In contrast with threaded pressure port interface 250 of FIG. 2A, pressure port interface 350 has a tube extension 356 that can be attached to a swage fitting. Otherwise, the combination of sensor device 205 with pressure port interface 350 performs as described above, demonstrating the reconfiguration benefits provided by embodiments of the present invention.

Figure 4A:
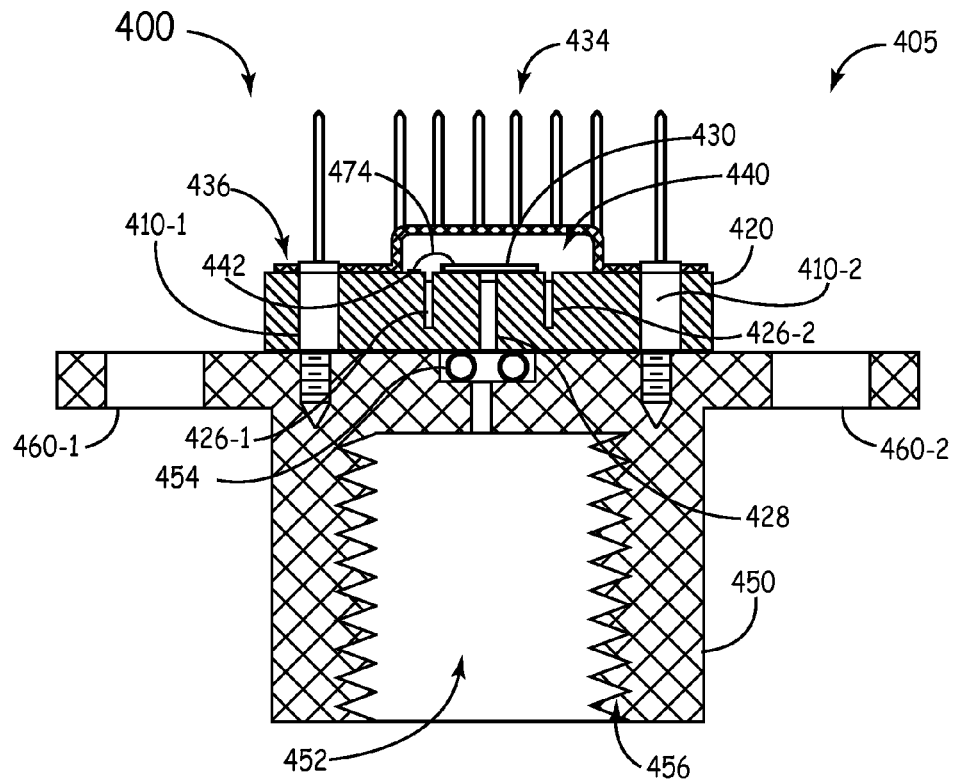
FIGS. 4A and 4B are views of another embodiment of the present invention of a modular sensor package.
Figure 4B:
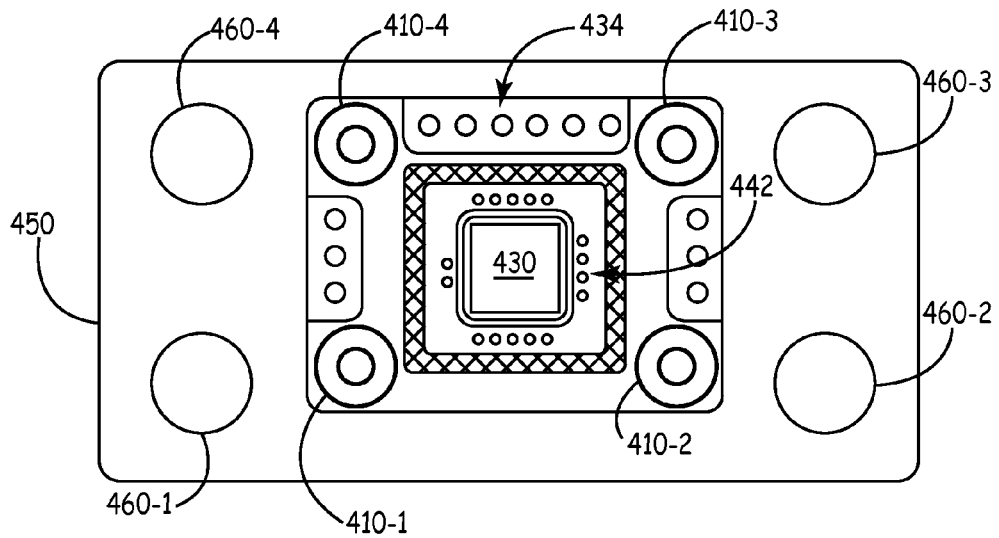

FIGS. 4A and 4B are views of another embodiment of the present invention of a modular sensor package shown generally at 400. Modular sensor package 400 comprises a pressure sensor 405 coupled to a pressure port interface 450. Pressure sensor 405 further comprises a ceramic substrate 420, a pressure sensor die 430, a cover 436, and a plurality of electrical connectors 434. In one embodiment, ceramic substrate 420 further comprises stress isolation trenches 426-1 and 426-2. Pressure sensor 405 is secured to pressure port interface 450 using screws 410-1 through 410-4. Also as described above, process pressure received at pressure port interface 450 is communicated to pressure sensor die 430 via port opening 428.

In the embodiment of FIG. 4A, cover 436 is a shaped cover (for example, rounded). Modular sensor package 400 utilizes a brazed seal to adhere cover 436 to substrate 420. In one embodiment, cover 436 is a Kovar material with a low TCE. The temperature during brazing is controlled such that it does not exceed the temperature limits of wire bonds or the pads attached to substrate 420. As would be appreciated by one of ordinary skill in the art upon reading this specification, a brazed cover 436 has an advantage over TE bonding when the surface of substrate 420 cannot be polished for TE bonding, or due to considerations such as cost restrictions.

Cover 436 is braized to substrate 420 and forms a cavity 440 in the gap between cover 436 and substrate 420. In this embodiment, the ceramic substrate 420 does not have a recessed portion. The pressure sensor die 430, wide bonds 444, and electrical pads 442 are located within the cavity 420 and operate as described above with respect to their counterparts in FIGS. 2A and 2B. In the embodiment of FIG. 4A, pressure port interface 450 comprises a threaded connection 456 and is otherwise identical to pressure port interface 250 described above with respect to FIG. 2A.

Figure 5:
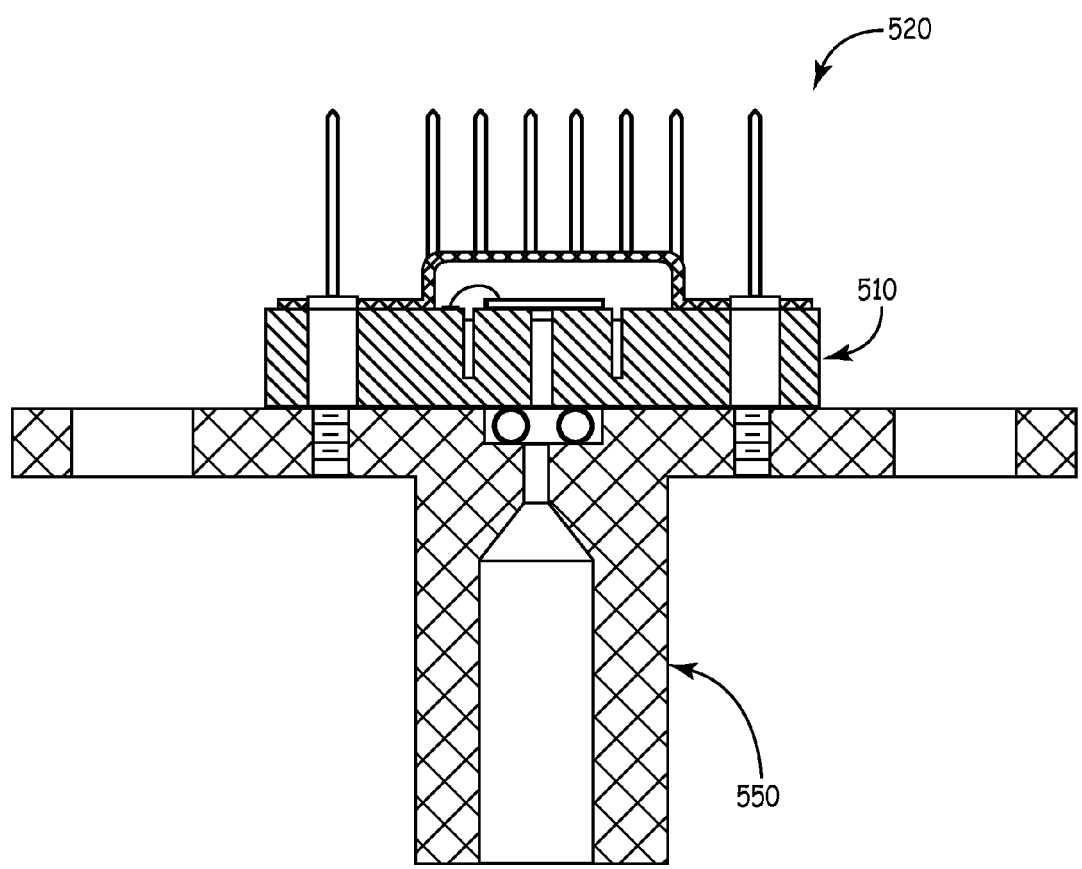
FIG. 5 is a side view of another embodiment of the present invention of a modular sensor package.

FIG. 5 is a side view of another embodiment of the present invention of a modular sensor package 500 comprising the sensor device 405 described above with respect to FIGS. 4A and 4B, coupled with pressure port interface 350 from FIG. 3. Otherwise, the combination of sensor device 405 with pressure port interface 350 performs as described above. As demonstrated above, modular pressure sensor packages 200, 300, 400, and 500 easily adapt to combinations of sensor devices with pressure port interfaces facilitating a variety of applications by selecting the appropriate combination for the application.

Figure 6A:
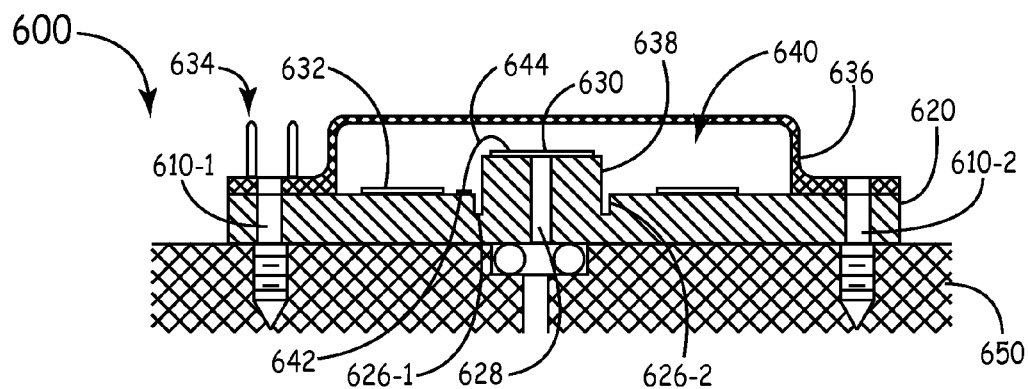
FIGS. 6A and 6B are views of another embodiment of the present invention of a modular sensor package.
Figure 6B:
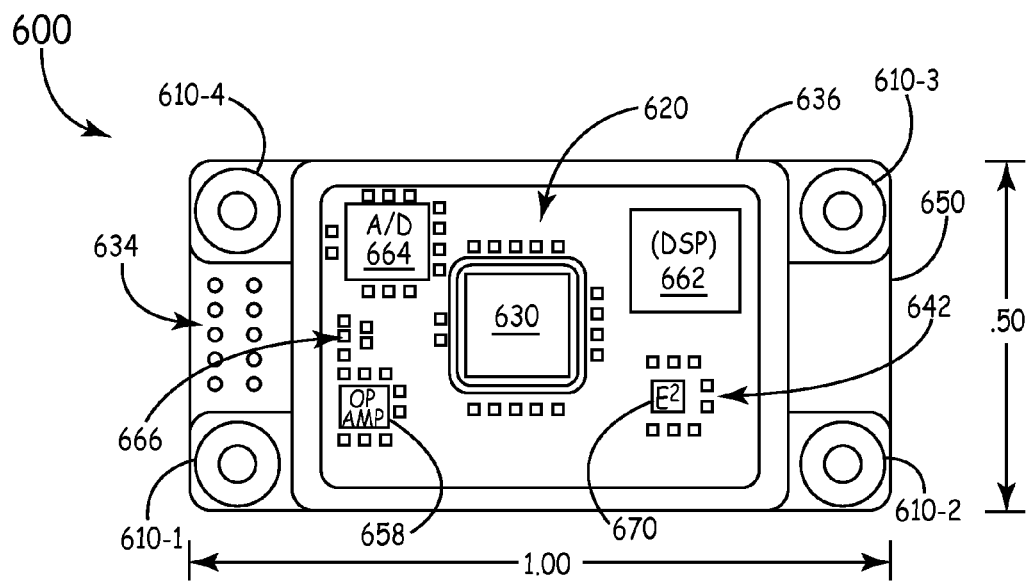

FIGS. 6A and 6B are views of another embodiment of the present invention of a modular sensor package shown generally at 600. Modular sensor package 600 comprises a ceramic substrate 620, a pressure sensor die 630, a cover 636, a plurality of electrical pins 634, electrical pads 642, mounting holes 610-1 through 610-4 for mounting screws or the like, and a pressure port interface 650. The ceramic substrate 620 comprises stress isolation trenches 626-1 and 626-2, screws 610-1 through 610-4, a raised portion 638, and port opening 628 within the raised portion 638. Pressure sensor die 630 is TE bonded to the raised portion 628. A cavity 640 is formed between cover 636 and ceramic substrate 620.

Modular sensor package 600 further comprises integrated circuit devices 632 mounted on substrate 620 within cavity 640. Co-locating integrated circuit devices with the pressure sensor die within a vacuum cavity reduces aging effects on the integrated circuit devices. In this embodiment, modular sensor package 600 co-locates the integrated circuit devices 632 and the pads 642 with the pressure sensor die 630 inside the cavity 640. In embodiments of the modular sensor package 100 where the integrated circuit devices 132 are co-located with the pressure sensor die 130 in the cavity 140, the pads 142 are also connected to the integrated circuit devices 132, either through wire bonds 144 or wire traces 124. The integrated circuit devices 132 resolve the electrical signals into pressure data that indicates the difference between the ambient pressure and the environment of the cavity 140. In another embodiment, the modular sensor package 600 also includes one or more transistors or capacitors mounted on substrate 620 within cavity 640.

FIG. 6B is a top view of pressure sensor package 600. Cover 636 is only partially shown so that the internal cavity 640 is depicted. Inside the cavity between cover 636 and ceramic substrate 620 is mounted a pressure sensor die 630, wire bond pads 642, and an assortment of integrated circuit devices 632. The integrated circuit devices 632 comprise a digital signal processor 662, an analog-to-digital converter 664, a voltage regulator 666, amplifying device 668, and a memory device 670. A suitable memory device 670 comprises a form of non-volatile memory, including by way of example, semiconductor memory devices (such as Erasable Programmable Read-Only Memory (EPROM) and Electrically Erasable Programmable Read-Only Memory (EEPROM). The integrated circuit devices are electrically connected with wire bonds to wire bond pads 642.

In one embodiment of modular sensor package 600, the output of pressure sensor die 630 is buffered using a series of resistors (referred to as temperature bridge resistors) on pressure sensor die 630 for temperature compensation. Amplifying device 668 (such as, for example, an operational amplifier) uses the temperature bridge resistors to provide the buffered output of the pressure sensor die 630. One embodiment of the output is a wheatstone bridge output as well as a low impedance buffered output that includes temperature compensation.

Memory 670 stores error correction coefficients that are used to make error corrections to output of the pressure sensor die 630. Each pressure sensor die 630 has specific error correction coefficients that are kept with modular sensor package 600 and typically calibrated during or after manufacture. When modular sensor package 600 is swapped with a new one (for example, during a field change if the original modular sensor package 600 fails), the new pressure sensor does not have to be calibrated because it already contains the error correction coefficients for that pressure sensor die.

Voltage regulator 666 provides a nearly constant voltage supply that improves the stability of pressure sensor 630. The analog-to-digital converter 664 converts the analog output of pressure sensor die 682 into a digital word. The digital signal processor 662 processes the digital word that the analog-to-digital converter 664 generates.

Performance of the high precision modular sensor package 600 is improved through reduced aging due to improved stability, and modular sensor package 600 is more able to achieve a predetermined percent drift specifications (for example, approximately 0.02 to 0.05% over 10 years). The circuitry of the embodiment shown in FIG. 6B is in proximity to the pressure sensor die 630, in a low noise environment, has reduced contamination problems, and is conditioned for the specific pressure sensor die 630.

Figure 7:
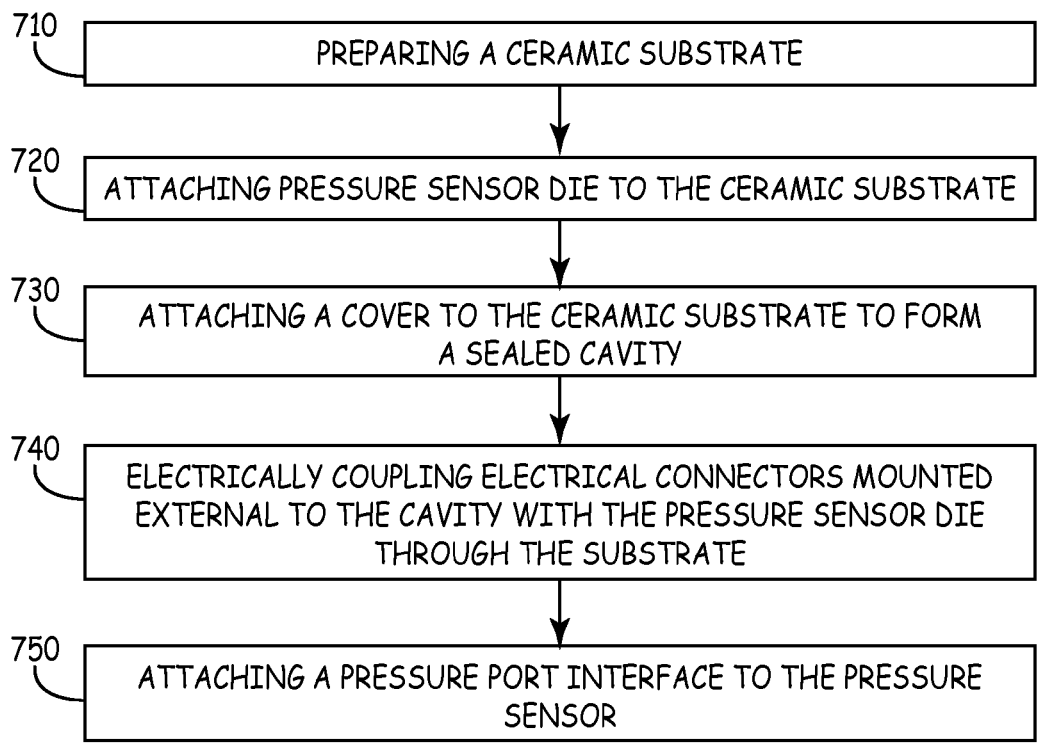
FIG. 7 is a flowchart illustrating one embodiment of a method of the present invention for providing a pressure sensor.

FIG. 7 is a flowchart illustrating one embodiment of a method 700 of the present invention for providing a pressure sensor. Method 700 begins at 710 with preparing a ceramic substrate. In one embodiment, preparing the ceramic substrate includes fabricating the ceramic substrate. Typically, the ceramic substrate is fabricated as a large panel for multiple pressure sensors. The material of the ceramic substrate is selected and matched to the TCE of the pressure sensor die. In different embodiments, the ceramic substrate comprise LTCC material, HTCC material, or an intermingled combination of co-fired ceramics. The ceramic substrate is shaped and metalized for its particular design (including making through vias, wire traces, pressure port, stress isolation chambers and a recess for the pressure sensor die).

Once the ceramic substrate is fabricated, the surfaces of the ceramic substrate that are used for TE bonding are polished. For example, the surfaces of the ceramic substrate that attach to a silicon cover and a silicon pressure sensor die are polished. Polishing improves the TE bonding for a strong, leak tight joint. After polishing, wire bond pads are applied. For example, gold or aluminum metallization is performed on the ceramic substrate to create the wire bond pads. The ceramic substrate is fired to bond its layers together into homogeneous ceramic substrate, which also creates vacuum integrity. In another embodiment of the method further including metallization of the ceramic substrate for as a stress distribution layer to support mounting screws. In one embodiment, the stress distribution layer is relatively thick when the cover is TE bonded. If the cover is a brazed cover, a stress distribution layer is not used when the mounting screws are incorporated into the cover. At this stage, in one embodiment, the method 700 also applies a getter to absorb low molecular weight gasses emitted from different areas inside the vacuum cavity. In one embodiment, preparing the ceramic substrate further comprise mounting integrated circuit devices onto the fired ceramic substrate.

Once the ceramic substrate is prepared, the method proceeds to 720 with attaching a pressure sensor die to the ceramic substrate. The attachments are made with inorganic materials in order to reduce offgassing and increase the operating temperature range of the pressure sensor. Wire bonding is performed to connect the pressure sensor die to the wire bond pads. This is performed on the panelized substrate using, for example, an automated pick and place wire bonding machine.

The method proceeds to 730 with bonding a cover to the ceramic substrate to form a sealed cavity. The cover is either TE bonded or brazed to the ceramic substrate. The panelized approach can be maintained all the way through characterization testing, which reduces costs.

The method proceeds to 740 with electrically coupling electrical pins mounted external to the cavity with the pressure sensor die through the substrate. In one embodiment, one or more of the electrical pins are further electrically coupled to the integrated circuit devices mounted within the cavity. In one embodiment, some of the pins are attached to the ceramic substrate directly and some are attached to the cover. In one embodiment, the electrical pins are electrically coupled to the pressure sensor die and/or the integrated circuit devices mounted within the cavity via wire traces embedded in the substrate.

The method proceeds to 750 with attaching a pressure port interface to the pressure sensor. The pressure port interface adapts the pressure sensor to couple to a pressure port and will comprise a compatible mechanical fitting (for example, a threaded fitting or a swage fitting) to form a pressure seal with the pressure port. The pressure port interface includes a cavity that exposes the pressure sensor to the pressure delivered at the pressure port so that pressure measurements can be obtained. In one embodiment, the electrical pins are attached to the pressure sensor on a side of the ceramic substrate opposing the pressure port interface to avoid placing unnecessary stresses on the electrical pins.

The embodiments described herein provide a unique pressure sensor packaging approach for silicon-based pressure sensors that has very low correctable errors, integral stressed isolation, and a modular approach to interfacing the pressure port for different end-use requirements, and support low cost manufacturing strategies. The modularity of the embodiments is extendable to accommodate various levels of integrated circuit devices complexity. The embodiments described herein are suitable for use in any pressure sensor application, such as avionics systems, factories with high vibrations, ships, or any other system or apparatus that uses pressure data.

Producing hermetic sealing for entry and exit of electrical connections with TE bonding improves the reliability of the pressure seal while simultaneously providing a substantial reduction in the manufacturing cost. Embodiments described herein also are adaptable to pneumatic connection requirements, give high performance, are flexible, and are operable over a higher temperature range. The embodiments described herein also have a smaller footprint than legacy pressure sensors, resulting in reduced weight and size that is particularly advantages for applications requiring low weight and size, such as aerospace. Embodiments described herein also reduce the possibility that a fractured electrical connector causes the loss of the reference pressure because the electrical connectors do not extend through the cavity that holds the reference pressure.

A number of embodiments of the invention defined by the following claims have been described. Nevertheless, it will be understood that various modifications to the described embodiments may be made without departing from the spirit and scope of the claimed invention. Features and aspects of particular embodiments described herein can be combined with or replace features and aspects of other embodiments. Accordingly, other embodiments are within the scope of the following claims.

What is claimed is:

1. A pressure sensor device for a modular pressure sensor package, the pressure sensor device comprising:
   a substrate having a pressure port that extends through the substrate from a first side of the substrate to a second side of the substrate;
   a pressure sensor die attached to the first side of the substrate, forming a seal over the pressure port on the first side of the substrate;
   a cover attached to the first side of the substrate over the pressure sensor die, forming a sealed cavity wherein the pressure sensor die is located within the cavity; and
   a plurality of electrical connectors mounted to the substrate external to the cavity, the plurality of electrical connectors electrically coupled to the pressure sensor die;
   wherein the substrate includes at least one mounting element configured to secure a pressure port interface to the second side of the substrate in a position around the pressure port.

2. The pressure sensor device of claim 1, further comprising:
   a plurality of wire bonding pads located within the cavity, wherein the pressure sensor die is electrically connected to the plurality of wire bonding pads by a plurality of wire bonds; and
   wherein the substrate further comprises a plurality of wire traces that electrically connect the plurality of wire bonding pads to the plurality of electrical connectors.

3. The pressure sensor device of claim 1, wherein the plurality of electrical connectors are mounted onto the first side of the substrate.

4. The pressure sensor device of claim 1, wherein the substrate comprises a low temperature co-fired ceramic, a high temperature co-fired ceramic, or a combination thereof.

5. The pressure sensor device of claim 1, wherein the substrate comprises at least one stress isolation trench proximate to the pressure sensor die and within the cavity.

6. The pressure sensor device of claim 1, further comprising the pressure port interface mounted to the substrate.

7. The pressure sensor device of claim 1, wherein the at least one mounting element comprises one of through holes or fold over tabs for mounting the pressure port interface to the substrate.

8. The pressure sensor device of claim 1, further comprising at least one integrated circuit device, transistor, or capacitor mounted to the substrate within the cavity.

9. The pressure sensor device of claim 1, wherein the cover comprises silicon and is thermoelectric bonded to the substrate.

10. The pressure sensor device of claim 1, wherein the cover is brazed to the ceramic substrate.

11. A modular pressure sensor, comprising:
    a pressure sensor device, including
        a substrate having a pressure port that extends through the substrate from a first side of the substrate to a second side of the substrate;
        a pressure sensor die bonded to the first side of the substrate, forming a seal over the pressure port on the first side of the substrate;
        a cover bonded to the first side of the substrate over the pressure sensor die, forming a sealed cavity wherein the pressure sensor die is located within the sealed cavity; and
        a plurality of electrical connectors mounted to the substrate external to the cavity, the plurality of electrical connectors electrically coupled to the pressure sensor die; and
    a pressure port interface secured to the second side of the substrate, the pressure port interface including:
        a cavity that extends through the pressure port interface from a first side of the pressure port interface to a second side of the pressure port interface;

wherein the pressure port of the substrate is aligned to and in communication with the cavity of the pressure port interface at the first side of the pressure port interface; and wherein the second side of the pressure port interface includes a pressure fitting.

12. The modular pressure sensor of claim 11, wherein the pressure fitting on the second side of the pressure port interface is one of either a swage fitting or a threaded fitting.

13. The modular pressure sensor of claim 11, wherein pressure sensor device is configured to disconnect from the pressure port interface by releasing a mounting device that secures the substrate to the pressure port interface.

14. The modular pressure sensor of claim 11, further comprising:

wherein the cover is brazed to the ceramic substrate; and wherein a getter is formed on a side of the cover internal to the cavity.

15. The modular pressure sensor of claim 11, wherein the pressure sensor device further comprises:

at least one integrated circuit device co-located with the pressure sensor die within the cavity, wherein the at least one integrated circuit device comprises one of a memory device, an analog-to-digital converter, a digital signal processor, a voltage regulator, or an amplifier.

16. The modular pressure sensor of claim 11, wherein the ceramic substrate further comprises:

a low temperature co-fired ceramic, a high temperature co-fired ceramic, or combinations thereof;

at least one stress isolation trench, wherein the at least one stress isolation trench forms part of the vacuum cavity; and a recessed portion;

wherein a thermal coefficient of expansion of the ceramic substrate is approximately matched to a thermal coefficient of expansion of the pressure sensor die; and wherein the cover comprises silicon and is thermoelectrically bonded to the ceramic substrate such that the cavity is formed over the recessed portion.

17. A pressure sensor apparatus comprising:

a ceramic substrate comprising a recessed portion and a pressure port;

a silicon cover thermoelectric bonded to the ceramic substrate such that a volume between the silicon cover and the recessed portion form a reference cavity;

a silicon pressure sensor die thermoelectric bonded to the ceramic substrate over the pressure port and within the reference cavity, wherein a thermal coefficient of expansion of the silicon pressure sensor die is approximately equal to a thermal coefficient of expansion of the ceramic substrate;

a plurality of electrical pads on a first side of the ceramic substrate, wherein the silicon pressure sensor die is electrically connected to at least one of the electrical pads; and a plurality of electrical connectors mounted to the ceramic substrate external to the reference cavity, the plurality of electrical connectors electrically coupled to the plurality of electrical pads; and wherein the ceramic substrate includes at least one mounting element configured to secure a pressure port interface to a second side of the ceramic substrate in a position around the pressure port.

18. The pressure sensor apparatus of claim 17, further comprising:

an analog-to-digital converter mounted on the ceramic substrate within the reference cavity, wherein the analog-to-digital converts an analog pressure signal from the silicon pressure sensor device into a digital signal; and a digital signal processor mounted on the ceramic substrate within the reference cavity, wherein the digital signal processor processes the digital signal.

19. The pressure sensor apparatus of claim 17, further comprising:

a memory device mounted on the ceramic substrate within the vacuum cavity, wherein the memory device stores error correction coefficients for the silicon pressure sensor die.

20. The pressure sensor apparatus of claim 17, wherein the ceramic substrate further comprises a first stress isolation trench located on a first side of the silicon pressure sensor die and a second stress isolation trench located on a second side of the silicon pressure sensor die.

* * * * *